United States Patent [19]

Temperley et al.

[11] Patent Number: 4,497,175
[45] Date of Patent: Feb. 5, 1985

[54] HYDRAULIC MASTER CYLINDER

[75] Inventors: Harry D. Temperley, Leamington Spa; Brian Joynes, Warwick, both of England

[73] Assignee: Automotive Products Limited, Leamington Spa, England

[21] Appl. No.: 563,266

[22] Filed: Dec. 20, 1983

Related U.S. Application Data

[63] Continuation of Ser. No. 297,561, Aug. 31, 1981, abandoned.

[30] Foreign Application Priority Data

Sep. 13, 1980 [GB] United Kingdom ............... 8029670

[51] Int. Cl.³ ............................................... F15B 7/00
[52] U.S. Cl. ....................................... 60/581; 60/589; 60/594; 92/75
[58] Field of Search ................ 60/581, 583, 594, 571, 60/589; 92/50, 69, 75

[56] References Cited

U.S. PATENT DOCUMENTS

| | | | |
|---|---|---|---|
| 2,001,749 | 5/1935 | Sauzedde | 60/594 |
| 2,590,144 | 3/1952 | Alward | 60/594 |
| 4,187,762 | 2/1980 | Buzby | 60/594 |
| 4,241,583 | 12/1980 | Farr | 60/594 |

Primary Examiner—Abraham Hershkovitz
Attorney, Agent, or Firm—Kemon & Estabrook

[57] ABSTRACT

A hydraulic master cylinder has pistons displaceable along the pivot axis of a brake pedal to apply the vehicle brakes. Motion between the pedal and the pistons is transmitted by balls located in a respective arcuate track formed partly in the pedal and partly in the respective piston. The master cylinder is particularly suitable for dual circuit brake systems. A master cylinder having a single piston is also disclosed.

6 Claims, 3 Drawing Figures

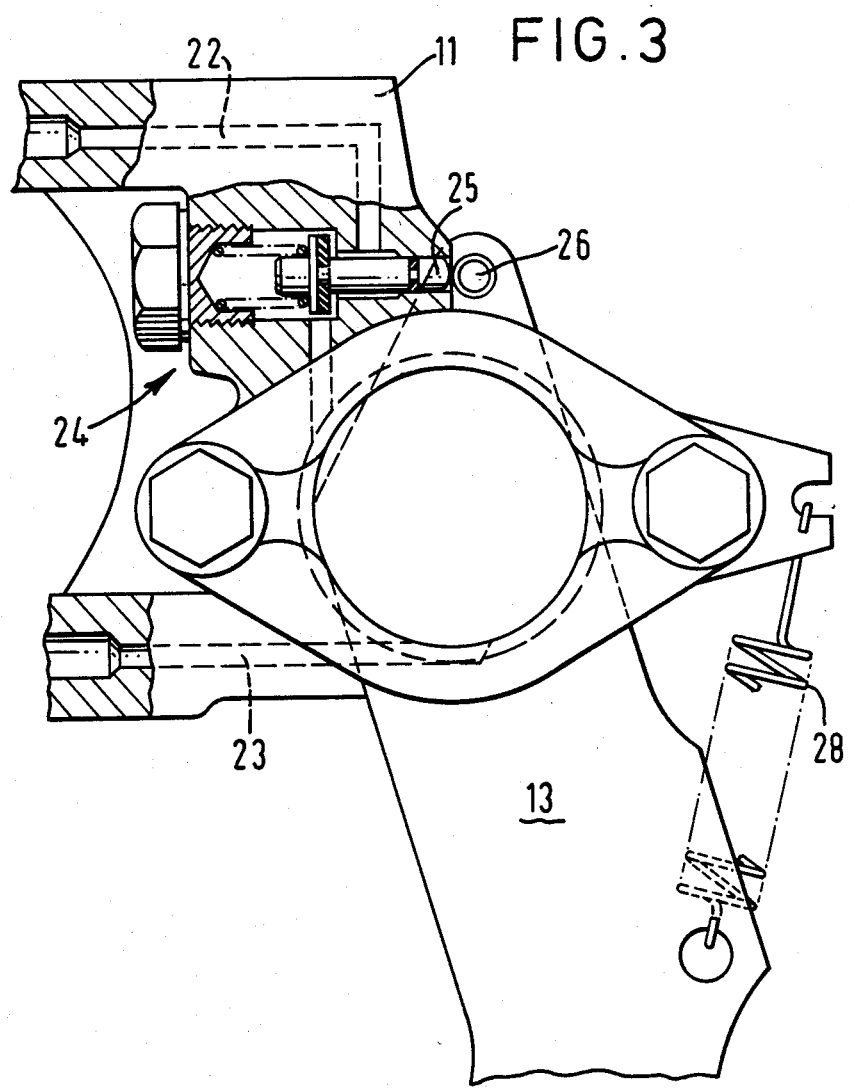

HYDRAULIC MASTER CYLINDER

This application is a continuation of application Ser. No. 297,561, filed 8/31/81 now abandoned.

This invention relates to hydraulic master cylinders particularly but not exclusively for motor vehicle braking systems.

Hitherto, hydraulic master cylinders having usually been mounted on the engine side of the vehicle bulkhead. Modern vehicle design is tending toward compact motor vehicles having more efficient use of under bonnet space. Conversely the requirement for dual line braking systems has resulted in longer bulkier hydraulic master cylinders. The effect of these developements has been to make the conversion of right-hand drive vehicles to left-hand drive, or vice-versa, extremely difficult due to lack of space for the master cylinder on the other hand side of the vehicle.

It has been proposed to move the pedal box to the other hand side of the vehicle whilst leaving the master cylinder at its original site but this solution entails connecting linkages which can increase the resilience and lost-motion in the braking system.

The present invention seeks to provide a compact hydraulic master cylinder which does not intrude into the vehicle under-bonnet space.

According to the invention there is provided a hydraulic master cylinder having a fluid displacing component movable by a lever characterised thereby that the component is movable along the pivot axis of the lever by expander means in response to angular movement of the lever.

The fluid displacing component may comprise a movable wall whose position determines the volume of a fluid chamber, said chamber having an inlet passage, for connection to a hydraulic reservoir, and an outlet passage, for connection to a component supplied by the master cylinder.

Closure valve means may be provided in the inlet passage to close the passage in response to movement of the lever.

The expander means preferably comprise wedge means having rolling elements between cooperating surfaces of the lever and of the component.

The rolling elements may be located in an arcuate track formed partly in the lever and formed partly in the component, the relative displacement of the component being governed by the depth of the track.

According to the invention, two fluid displacing components are provided, the components having a common axis of displacement but being displacable in opposite directions on angular movement of the lever.

A master cylinder according to this invention has the particular advantage that it is intended to be mounted within the vehicle drivers compartment and thus does not intrude into the vehicle under bonnet space. Such a master cylinder can be compact enough to be fitted into the space available in a drivers compartment without extensive modification. The necessary fluid reservoir can be mounted in any convenient position.

The master cylinder is particularly suited to dual line braking systems where two opposed fluid displacing chambers may be provided, each having an independent fluid supply and being connected each to one set of brake actuators.

A subsidiary advantage of the invention is that, being mounted in the vehicle drivers compartment, the master cylinder is situated in a less hostile environment.

Other features of the invention are included in the following description of a preferred embodiment shown, by way of example only, on the accompanying drawing in which:

FIG. 3 is a part-sectional end view of the master cylinder of FIG. 1 and FIG. 2.

Figure 1:
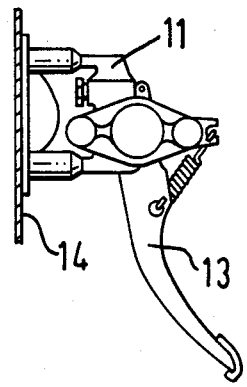
FIG. 1 is a pictorial representation of a master cylinder installation according to the invention.
Figure 2:
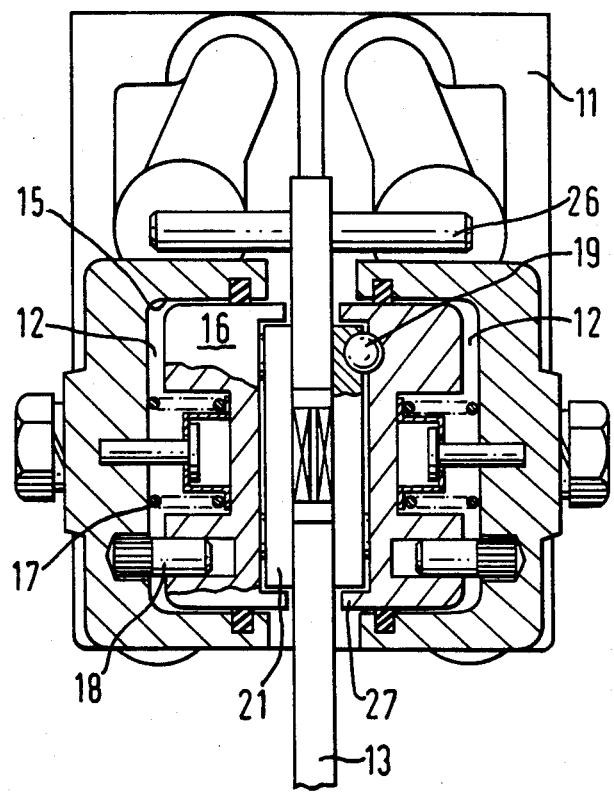
FIG. 2 is a transverse section through the operating chambers of the master cylinder shown in FIG. 1.

The invention will be described as applied to a hydraulic master cylinder for a vehicle hydraulic braking system.

With reference to the figures there is shown a master cylinder body 11 having a pair of hydraulic actuation chambers 12 between which a brake pedal lever 13 is supported for pivotal movement, the chambers 12 being on a common longitudinal axis with the pivot axis of the pedal lever 13. The body 11 is attached to the vehicle bulkhead 14 inside the vehicle passenger compartment. Each actuating chamber 12 comprises a cylindrical bore 15 open towards the brake pedal 13 and housing a piston 16 slidable therein. Each piston is resiliently urged out of its bore by a return spring 17, and a peg 18 between each piston and the corresponding bore wall prevents relative rotation therebetween.

A series of balls 19 are located between each piston 16 and the pedal 13 in a respective circular track formed partly in the piston and partly in a boss 21 of the pedal.

Each track is symmetrical but increases in depth along the track length such that relative rotation between the pedal and the pistons will urge each piston into its bore against the effect of the spring 17.

Each chamber 12 is connected through an inlet passage 22 to a fluid reservoir (not shown) and through an outlet passage 23 to the wheel brake actuators (not shown) of a vehicle hydraulic braking system.

A closure valve 24 is provided in the inlet passage 22 to close communication between the fluid reservoir and the respective actuating chamber 12. The valve 24 includes a protruding rod member 25 engagable by a cross-shaft 26 of the pedal 13 to open the valve 24 when the pedal is in the returned position.

The pedal 13 must float axially of the chambers 12 in order to equalize the load exerted on each piston 16. To prevent inadvertent withdrawal of the pedal transversely to the chamber axis each piston includes an annular collar 27 which partially encompasses the respective pedal boss 21.

Operation of the master cylinder is as follows:

On initial depression of the pedal 13 the closure valve 24 seals the chamber 12 from the fluid reservoir. Further depression of the pedal urges the pistons 16 into their respective bores 15 and the consequent increasing fluid pressure in the outlet passage 23 actuates the vehicle wheel brakes.

On release, the pedal returns under the action of the usual spring 28 to open the closure valves 24 and vent the chambers 12 to the fluid reservoir. The pistons 16 return under the action of their springs 17 so maintaining the balls 19 in their respective tracks.

Where a dual line braking system is required the respective outlet passages 23 may be connected each to one group of wheel brake actuators.

The rate of increase of depth of the ball tracks may be constant or may vary should a variable ratio master cylinder be required. For instance, a rapid rate of increase at the start of brake pedal travel would actuate the wheel brakes sufficiently to overcome the pull-off springs and provide a "quick start" to initial braking of the vehicle.

Although the master cylinder has been described with reference to pistons reciprocal in co-operating bores, it will be realised that other fluid displacing means, such as diaphragms or bladders are applicable to the invention. This construction can also provide a pivot for a clutch pedal thus eliminating the usual mounting bracket.

We claim:

1. A hydraulic master cylinder comprising:
   a body;
   a pair of fluid chambers within the body each of which is concentric about a common longitudinal axis;
   a pair of inlet passages in the body each connecting a respective fluid chamber to a fluidic source;
   a pair of outlet passages in the body affording means for connecting each fluid chamber to hydraulically operable devices;
   closure valve means between each fluid chamber and the fluidic source;
   a pair of fluid displacing means, one each for said fluid chambers;
   a lever having a pivot axis common with the longitudinal axis of the fluid chambers and supported so as to allow for pivotal movement about the pivot axis and floating lateral movement along the pivot axis; and
   expander means responsive to rotational movement of the lever to urge one fluid displacing means in one direction while simultaneously urging the other of said fluid displacing means in the opposite direction along said longitudinl axis, the floating lateral movement of the lever allowing the expander means to apply equal forces to both of said fluid displacing means.

2. A dual master cylinder according to claim 1, wherein said expander means are provided on either side of lever.

3. A dual master cylinder according to claim 1, wherein said expander means comprises rolling elements located in an arcuate track formed partly in the lever and formed partly in the adjacent fluid displacing means.

4. A dual master cylinder according to claim 2, wherein said expander means comprises rolling elements located in an arcuate track formed partly in the lever and formed partly in the adjacent fluid displacing means.

5. A dual master cylinder according to claim 3, wherein each of said displacing means comprises a piston slidable in the respective fluid chamber.

6. A dual master cylinder according to claim 5, wherein said closure valve is directly operable by the lever.

* * * * *